US009879692B2

(12) United States Patent
Loderer et al.

(10) Patent No.: US 9,879,692 B2
(45) Date of Patent: Jan. 30, 2018

(54) FROTH PUMP AND METHOD

(71) Applicant: Weir Minerals Europe Limited, Lancashire (GB)

(72) Inventors: Pavol Loderer, Todmorden (GB); Aleksander S. Roudnev, Deforest, WI (US); Luis Moscoso Lavagna, North Ryde (AU)

(73) Assignee: Weir Minerals Europe Limited, Lancashire (GB)

( * ) Notice: Subject to any disclaimer, the term of this patent is extended or adjusted under 35 U.S.C. 154(b) by 145 days.

(21) Appl. No.: 14/388,712

(22) PCT Filed: Mar. 27, 2013

(86) PCT No.: PCT/GB2013/050804
§ 371 (c)(1),
(2) Date: Sep. 26, 2014

(87) PCT Pub. No.: WO2013/144623
PCT Pub. Date: Oct. 3, 2013

(65) Prior Publication Data
US 2015/0090123 A1    Apr. 2, 2015

(30) Foreign Application Priority Data

Mar. 29, 2012  (AU) ................................ 2012901249
Mar. 29, 2012  (GB) .................................. 1205553.9
(Continued)

(51) Int. Cl.
B01D 45/00        (2006.01)
F04D 29/22        (2006.01)
(Continued)

(52) U.S. Cl.
CPC ..... F04D 29/2288 (2013.01); B01D 19/0052 (2013.01); B01D 19/02 (2013.01);
(Continued)

(58) Field of Classification Search
CPC .... F04D 29/2288; F04D 29/4286; F04D 7/04; F04D 7/045; B01D 19/02;
(Continued)

(56) References Cited

U.S. PATENT DOCUMENTS 4,273,562 A    6/1981   Niskanen
4,776,758 A   10/1988   Gullichsen
(Continued)

FOREIGN PATENT DOCUMENTS

CN    201110267 Y    9/2008
EP    0298693 A2     1/1989
(Continued)

OTHER PUBLICATIONS

Australian Patent Office International-Type Search Report issued in corresponding AU2012901249, dated Jun. 6, 2012.
(Continued)

*Primary Examiner* — Dung H Bui
(74) *Attorney, Agent, or Firm* — Gardere Wynne Sewell LLP

(57) ABSTRACT

A pump (10) comprising a pump casing (20) having front and rear sides (23, 24) with a pumping chamber (38), a chamber inlet (26) and a discharge outlet (27). An impeller (40) within the chamber rotates about an axis. The chamber includes an inner region at or near the axis and an outer region remote from the axis within which is the discharge outlet. The impeller includes a shroud (42) having front and rear faces (43, 44) with a plurality of pumping vanes (46). A collection chamber (60) is provided at the rear side of the pump casing in fluid communication with the pumping
(Continued)

chamber. The impeller includes one or more passageways (52) through the shroud, one end opening into the collection chamber and the other opening into the pumping chamber through the impeller front face. A flow inducer (70, 72) is within the collection chamber, which includes a venting outlet (62) and a transfer outlet zone in fluid communication with the outer region of the pumping chamber.

15 Claims, 14 Drawing Sheets

(30) Foreign Application Priority Data

| Aug. 2, 2012 | (AU) | ................................ 2012903341 |
| Aug. 2, 2012 | (GB) | .................................. 1213761.8 |
| Sep. 28, 2012 | (AU) | ................................ 2012904251 |
| Sep. 28, 2012 | (GB) | .................................. 1217360.5 |

(51) Int. Cl.
| *B01D 45/08* | (2006.01) |
| *F04D 7/04* | (2006.01) |
| *B01D 19/00* | (2006.01) |
| *F04D 29/42* | (2006.01) |
| *B01D 19/02* | (2006.01) |

(52) U.S. Cl.
CPC ............... *B01D 45/08* (2013.01); *F04D 7/04* (2013.01); *F04D 7/045* (2013.01); *F04D 29/4286* (2013.01)

(58) Field of Classification Search
CPC ............... B01D 19/0052; B01D 45/08; F05B 2210/132; D21D 5/26; F03D 9/002; F03D 1/0675; Y02E 10/722; Y02E 10/721
See application file for complete search history.

(56) References Cited

U.S. PATENT DOCUMENTS

| 4,921,400 | A | 5/1990 | Niskanen |
| 4,936,744 | A | 6/1990 | Dosch et al. |
| 5,019,136 | A | 5/1991 | Elonen et al. |
| 5,078,573 | A | 1/1992 | Peroaho et al. |
| 5,116,198 | A | 5/1992 | Vesala et al. |
| 5,209,641 | A | 5/1993 | Hoglund et al. |
| 5,219,472 | A * | 6/1993 | Elonen .................... D21D 5/26 162/28 |
| 5,324,166 | A | 6/1994 | Elonen et al. |
| 5,366,347 | A | 11/1994 | Hoglund |
| 7,435,277 | B2 * | 10/2008 | Raussi ............... B01D 19/0052 55/406 |

FOREIGN PATENT DOCUMENTS

| EP | 0298442 | 11/1989 |
| EP | 0395236 A1 | 10/1990 |
| WO | WO-92003612 A1 | 3/1992 |
| WO | WO-95015439 A1 | 6/1995 |

OTHER PUBLICATIONS

Search Report for corresponding GB1205553.9, dated Jul. 17, 2012.
International Search Report issued in corresponding Appln. No. PCT/GB2013/050804; dated May 31, 2013, 3 pages.
International Preliminary Report on Patentability issued in corresponding Appln. No. PCT/GB2013/050804; dated Jul. 17, 2014, 6 pages.
Australian Patent Office Examination Report No. 1 issued in corresponding AU 2013239452, dated May 19, 2016.
Response to Examination Report No. 1 dated May 19, 2016 in corresponding AU 2013239452, dated Jan. 9, 2017.
Notice of Acceptance for Patent Application AU 2013239452, dated Jan. 19, 2017.
EP Decision to Grant a European Patent Pursuant to Article 97(1) EPC issued in EP 2013714326 dated Sep. 29, 2016.
English translation of First Office Action issued in Chinese Patent App. No. 2013800289636 dated Feb. 3, 2016.
English Abstract of CN201110267Y dated Sep. 3, 2008.
English translation of KR 10-2010-0040356 A dated Apr. 20, 2010.

* cited by examiner

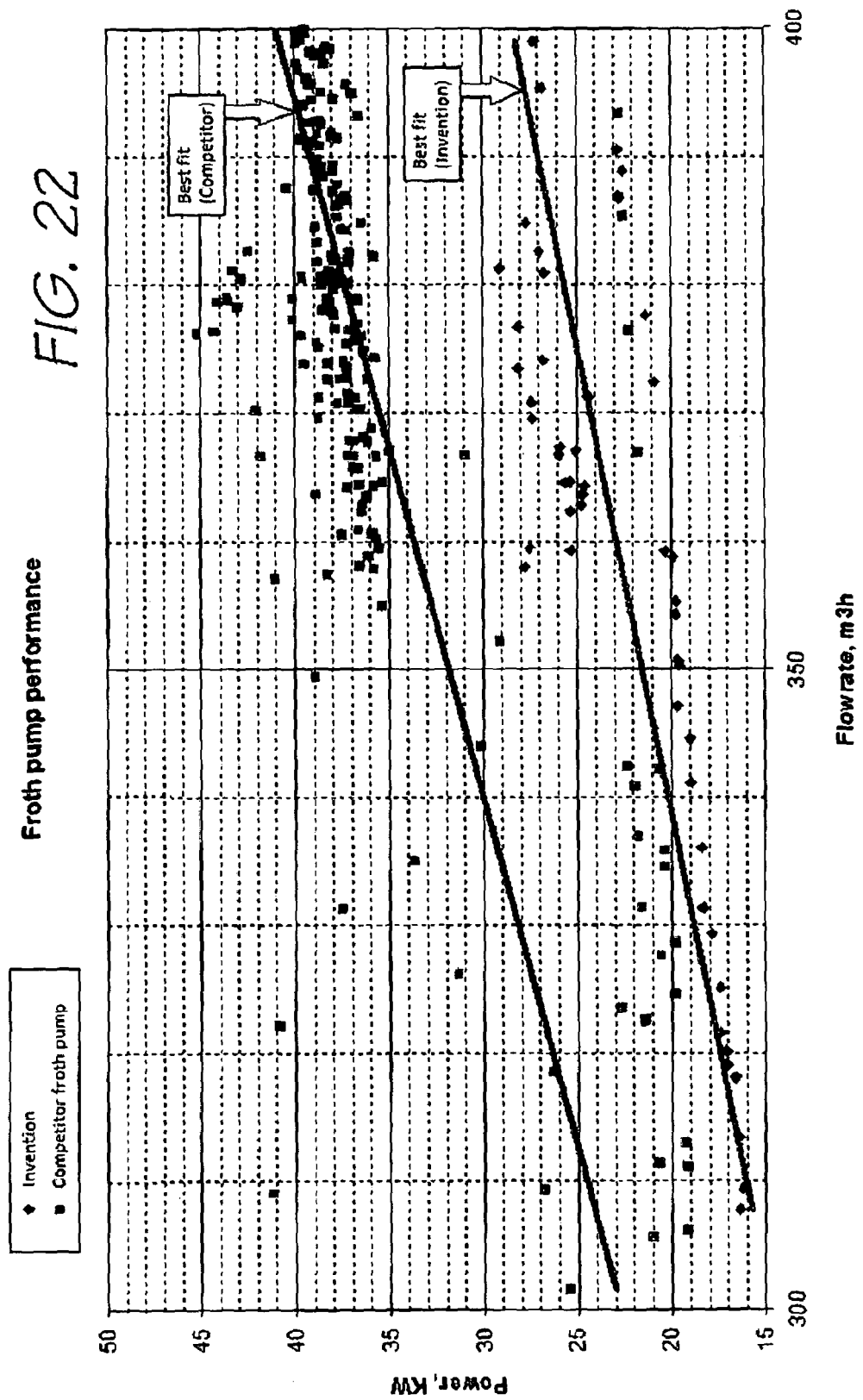

FROTH PUMP AND METHOD

PRIORITY CLAIM

This application is a 371 filing of PCT/GB2013/050804 filed Mar. 27, 2013, which claims priority from the following applications: United Kingdom Patent Application No. 1205553.9 filed Mar. 29, 2012; United Kingdom Patent Application No. 1213761.8 filed Aug. 2, 2012; Australia Patent Application No. 2012901249 filed Mar. 29, 2012; Australia Patent Application No. 2012903341 filed Aug. 2, 2012; Australia Patent Application No. 2012904251 filed Sep. 28, 2012; and United Kingdom Patent Application No. 1217360.5 filed Sep. 28, 2012, the disclosures of which are incorporated by reference in their entirety.

TECHNICAL FIELD

This disclosure relates generally to pumps and methods of pumping fluid particularly but not limited to frothy fluids, such as for example, mineral froth flotation concentrates.

BACKGROUND ART

Mineral processing plants often utilise a flotation process to separate the finely-ground particulates of a required mineral from waste rock. This is achieved in a flotation tank or cell in which the slurry is placed and to which fine air bubbles and reagents are added. The tank is then agitated and the resulting froth which rises to the top of the flotation cell has the fine particles of the required mineral adhering to the air bubbles. Collection of the froth then provides a means of collecting the required concentrated mineral which has been extracted by the process.

The froth from the flotation process contains the required mineral and normally must be pumped to the next processing stage. The different types of froth produced depend a lot on the particles sizes being floated, the type and quantity of reagents and the quantity and size of the air bubbles. The froth process is continuous but there is currently no commercially-available equipment which can reduce the air content of the froth, and it is not practical to leave the froth standing until the air separates by itself before pumping the remanent particles and liquid which formed the froth.

To achieve good recovery results from the flotation process requires that the mineral ore be ground to very fine particle sizes (in some cases less than 10 micrometres). Also to achieve good mineral recovery the reagents used in the process need to be controlled, but quite often this, combined with the amount of bubbles necessary to make the process efficient, can result in a very stable and tenacious froth. These tenacious froths when left in a vessel would typically take 12 to 24 hours to reduce to the water and solid state only, that is, the bubbles would be extremely slow to disperse.

Pumps for use for pumping froth currently are in the form of vertical and/or horizontally disposed pumps. Vertical pumps are arranged so that the pump inlet is disposed generally vertically, and horizontal pumps are arranged with the pump inlet disposed generally horizontally. Vertical froth pumps have been demonstrated to be able to pump very tenacious froths, but are often physically quite large and therefore must be considered in the initial design of a mineral processing plant.

Horizontal pumps, on the other hand, have also been used for froth pumping applications, but these are not always successful with tenacious froths. Horizontal pumps have traditionally been deliberately oversized in froth-handling applications. A larger size pump means that they can be operated inefficiently with a resultant low flow and a high air entrainment due to the froth. Mechanical failures can become a problem with such unsteady pumping. Froth is full of air, but being present as very small bubble sizes has less effect than the same quantity of air in the form of large bubbles. However, there is a point at which the ability of a pump to tolerate froth will drop due to the effect of the air. The air tolerance of a pump is also related to the net positive suction head (NPSH) characteristic; that is, the lower the net pressure available at the intake to the pump, the more likely it is that the performance will be affected.

Pumps have been developed to specifically handle frothy fluids of this type. During the pumping operation, the heavier fraction of the fluid migrates to an outer region of the pump and a lighter fraction tends to migrate towards an inner region. There is a need to be able to efficiently remove the lighter fraction.

SUMMARY OF THE DISCLOSURE

In a first aspect, there is provided a pump comprising a pump casing having a front side and a rear side with a pumping chamber within the pump casing, an inlet to the pumping chamber, and a discharge outlet from the pumping chamber, an impeller mounted for rotation within the pumping chamber about a rotation axis, the pumping chamber including an inner region at or near the rotation axis and an outer region remote from the rotation axis, the discharge outlet being in the outer region of the pumping chamber, the impeller including a shroud having a front face and a rear face with a plurality of pumping vanes extending from the front face, the pump further including a collection chamber at the rear side of the pump casing, the collection chamber being in fluid communication with the pumping chamber, the impeller including one or more passageways extending through the shroud, one end of said passageway(s) opening into the collection chamber and the other end opening into the pumping chamber through the front face of the impeller, and a flow inducer disposed within the collection chamber, the collection chamber including a venting outlet and transfer outlet zone in fluid communication with the outer region of the pumping chamber.

The flow inducer in the collection chamber energizes the gas fluid in that collection chamber, especially when the flow rate into the collection chamber is high. This addition of energy causes the gas and fluid to flow out of the back venting part of the collection chamber, and there is no need for any external device (such as a separate suction pump) to physically suck air from the collection chamber.

In certain embodiments, the pump includes auxiliary vanes on the rear face of the impeller shroud.

In certain embodiments, the flow inducer comprises an inducer element mounted for rotation within the collection chamber.

In certain embodiments, the flow inducer element is configured so as to generate an axial flow component and a swirl flow component of a fluid within the collection chamber.

In certain embodiments, the pump includes a drive shaft the impeller and inducer element being operatively mounted to the drive shaft for rotation thereby.

In certain embodiments, the or each passageway is disposed within the inner region of the pumping chamber.

In certain embodiments, the vent outlet is remote from the pumping chamber.

In certain embodiments, the vent outlet and the or each passageway are substantially parallel to the rotation axis.

In certain embodiments, the collection chamber includes an open front side facing the impeller and the transfer outlet zone is comprised by an annular gap between the rear side of the pump casing and the rear face of the impeller.

In certain embodiments, the open front side of the collection chamber has an outer peripheral diameter which is less than the diameter of the pumping chamber.

In certain embodiments, the pump is a froth pump for pumping frothy fluids wherein the impeller is configured to separate the frothy fluid into a heavier fraction which is discharged through the discharge outlet and a lighter fraction which enters the collection chamber via the passageways where the inducer separates the lighter fraction into a secondary heavier fraction which is returned to the pumping chamber via the transfer outlet zone and the remaining fluid is discharged through the venting outlet.

In a second aspect, there is provided a method of pumping a fluid through a pump, the fluid being capable of separating into lighter and heavier fractions, the pump comprising the pump being as described above, the method including the steps of:
(a) feeding the fluid into the pumping chamber wherein a first heavier fraction is discharged through the discharge outlet and a first lighter fraction migrates towards the inner region of the pumping chamber;
(b) inducing a flow in an axial direction thereby causing the first lighter fraction to enter the collection chamber through the or each passageway and thereafter; and
(c) causing separation of the first lighter fraction into a second heavier fraction and a second lighter fraction wherein the second heavier fraction is returned to the pumping chamber via the transfer outlet zone and the second lighter fraction passes out of the collection chamber through the venting outlet.

In certain embodiments, the pumped fluid is a frothy fluid.

In a third aspect, there is provided a method of pumping a frothy fluid through a pump in order to substantially degas the said fluid, the method including the steps of:
(a) feeding the fluid into a pumping chamber of a pump, wherein a heavier fraction is discharged through a discharge outlet of the pump, and a lighter fraction migrates towards an inner region of the pumping chamber via passageways extending through a pumping impeller and into a collection chamber;
(b) causing separation of the lighter fraction to substantially release gas therefrom in the collection chamber by operation of a rotatable flow inducer disposed within the collection chamber; and
(c) inducing the self-discharge of said released gas through a venting outlet of the collection chamber.

In certain embodiments, the method of the third aspect is operable using any of the apparatus defined in the first aspect.

BRIEF DESCRIPTION OF THE DRAWINGS

Notwithstanding any other forms which may fall within the scope of the methods and apparatus as set forth in the Summary, specific embodiments will now be described, by way of example, and with reference to the accompanying drawings in which:

FIG. 22 depicts the results of various experimental trials of the performance of a froth pump having the features of the invention when compared with the performance of a competitor commercial froth pump, when Power (kW) and Flow Rate (m³/hr) are measured.

DETAILED DESCRIPTION OF SPECIFIC EMBODIMENTS

Figure 1:
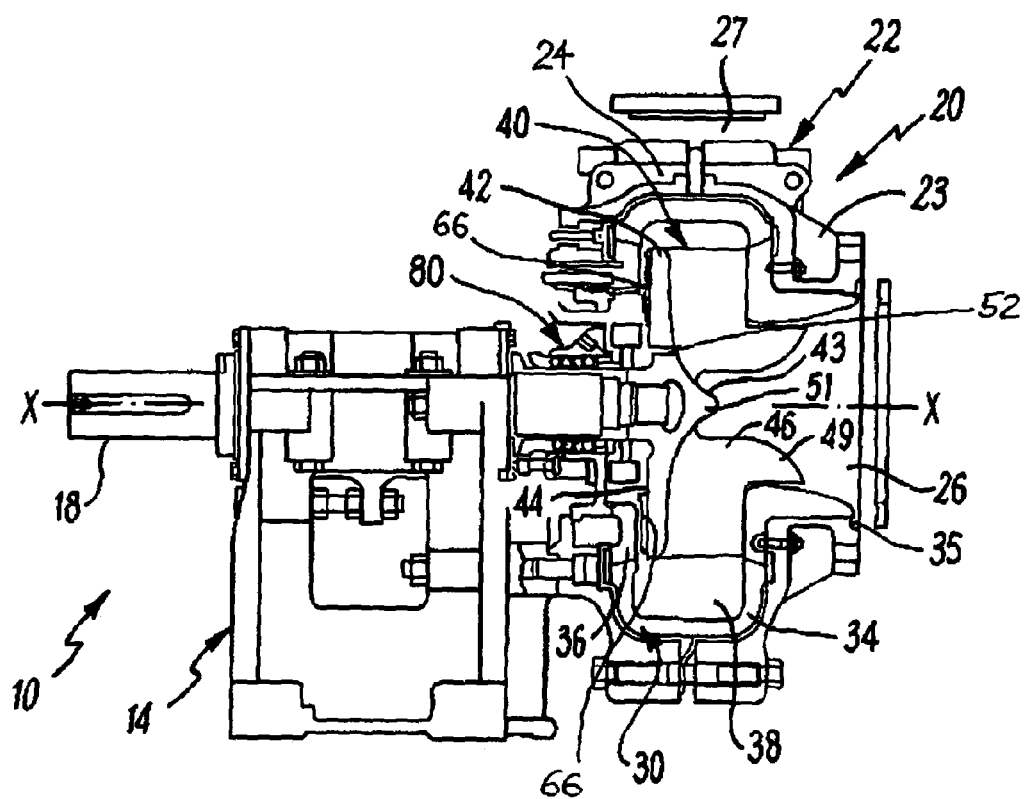
FIG. 1 is a schematic, partially sectional side elevation of a pump according to one embodiment.

Referring in particular to FIG. 1, there is illustrated a pump 10 comprising a pump housing 20 which is mounted to a support 14 (often referred to as a pedestal, base or frame). The pump housing 10 comprises an outer casing 22 which includes a front casing part 23 and a rear casing part 24 which are connected together by a series of bolts. The pump housing 10 further comprises an inlet 26 for feed fluid to be pumped to the pump and a discharge outlet 27 from which fluid can be discharged from the pump.

The pump housing 20 further comprises an inner liner 30 within the outer casing 22. The liner 30 includes a main liner 34 which may be in the form of a volute and side liners which comprise a front liner 35 and a back liner 36. The main liner 34 may comprise two parts or halves which are assembled together to form a volute liner shaped like a car tyre. The main liner can also be a one piece structure, as illustrated in FIG. 1. The liner may be formed from rubber or an elastomer material. The interior of the liner 30 forms a pumping chamber 38 through which the fluid being pumped passes.

The pump 10 further includes an impeller 40 which is mounted for rotation within the pumping chamber 38 about axis of rotation X-X. The impeller 40 is connected to a drive shaft 18 which in turn is connected to a drive (not shown). The impeller 40 illustrated is of the semi-open type and includes a shroud 42 having a front face 43 and a rear face 44. The impeller 40 includes a series of pumping vanes 46 projecting from the front face of the shroud. The pumping vanes 46 are evenly spaced around the rotation axis and are specially designed for handling frothy fluids and have a number of projecting portions each in the form of a curved scoop 49 which extends into the inlet. The impeller further includes a central eye 51 which extends forwardly of the front face 43 of the shroud 42 and in use the curved scoops 49 function to drag material into the open centre of the impeller in front of the central eye 51. Other features of the impeller 40 will be described later. Auxiliary vanes 66 are provided on the back face of the impeller 40. The auxiliary vanes 66 are evenly spaced around the rotation axis and have inner and outer ends. The auxiliary vanes 66 may be straight, curved or any other suitable configuration.

The pump 10 further includes a seal assembly 80 which provides a seal between the shaft 18 and the pump housing 20. The seal assembly as shown is housed at a stuffing box 87.

Figure 2:
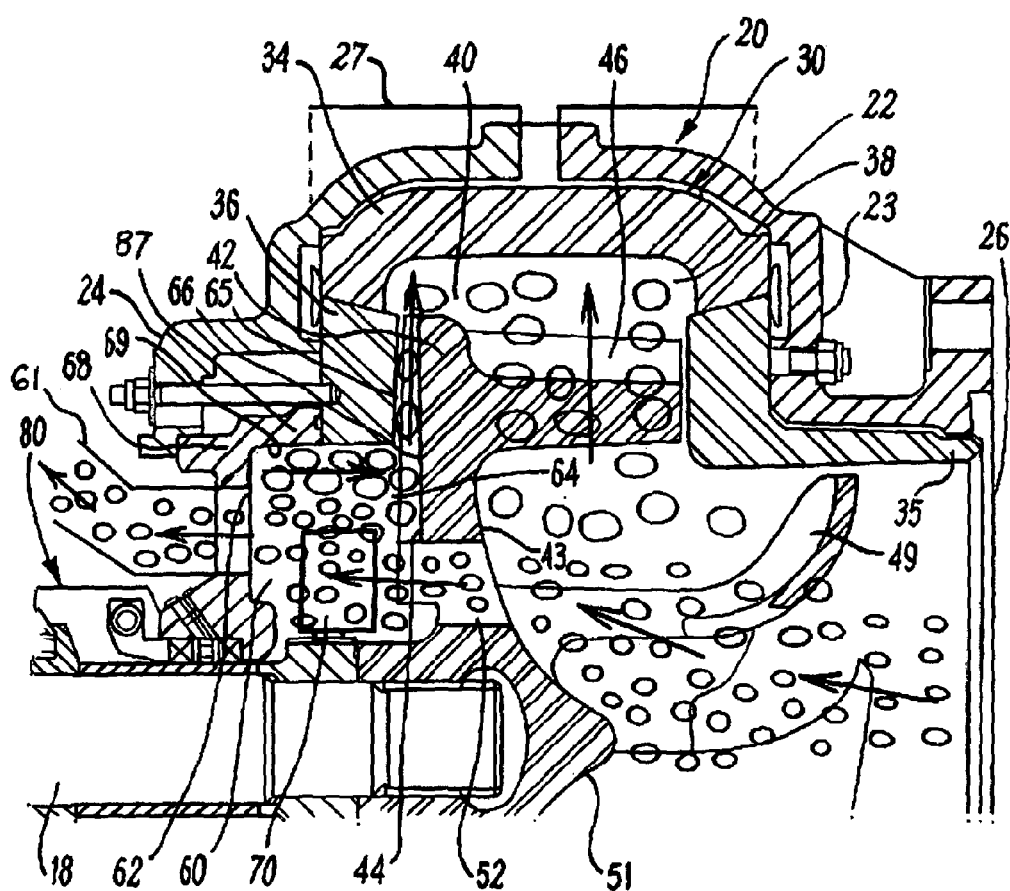
FIG. 2 is a cross-sectional detail of part of a pump according to one embodiment.
Figure 3:
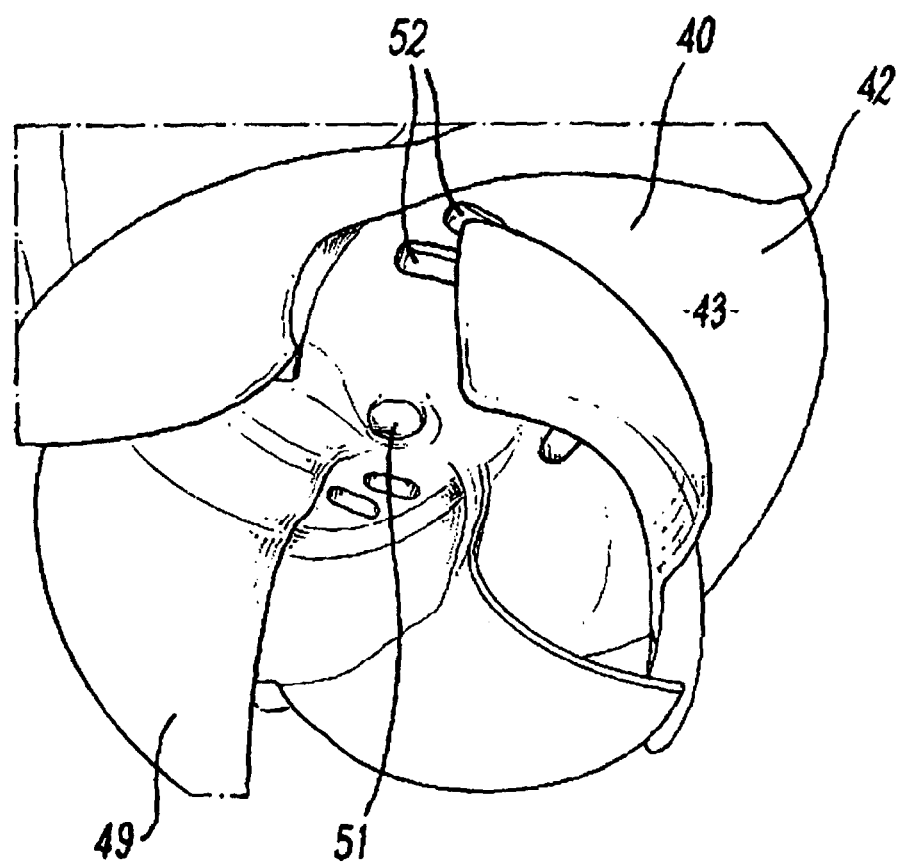
FIG. 3 is a detail of part of a pump impeller according to one embodiment.

As is best illustrated in FIG. 2, the impeller 40 includes a series of passageways in the form of through-holes 52 arranged therein, each of which extend from the front face 43 to the rear face 44 of the impeller 40. The through-holes 52 are in the region of the rotation axis X-X and are positioned between adjacent pumping vanes 46. As shown in FIGS. 2 and 3, the through-holes 52 extend in a direction generally parallel to the axis of rotation X-X. The passageways may be of any suitable size and cross sectional dimension and configuration. In FIG. 3, the through-holes 52 shown have an elongate width dimension and appear as a slot. Generally there will be one or more passageways located in each impeller channel arranged between adjacent pumping vanes 46, so that each impeller channel is vented during operation. Experimental measurements have shown that air in a froth being pumped by the impeller 40 will concentrate in the impeller eye, sometimes forming a 'cloud' which inhibits head and flow generation and reduces impeller efficiency. The function of the passageways is to deliver a first "light fraction" of gas and some solids from the impeller inlet region 26 (especially around the impeller eye 51) into the collection chamber 60, as will shortly be described. The cross-sectional area of the passageways needs to be sufficient to remove as much air from the impeller channels as necessary, but if the through-holes 52 or other passageways are too large, it may allow froth slurry to pass straight through into the collection chamber 60, which is undesirable.

The pump collection chamber 60 is located on the rear side of the pump casing and behind the impeller 40. The collection chamber 60 is adjacent with the rear face 44 of the impeller and located inside the seal chamber or stuffing box 87. The through-holes 52 open into the collection chamber 60. The collection chamber 60 includes a venting outlet in the form of a vent hole 62 arranged in a rear wall 63 of the stuffing box 87 and which is remote from the pump impeller 40. The venting hole 62 can be in fluid communication with a tank, for example by means of a suitable ducting or pipe 61, which extends from the stuffing box via other connected conduits to the tank, which for example is at atmospheric pressure or can even be under suction. The collection chamber 60 has an outer peripheral side wall 68 which may be generally cylindrical, and an open side 64 which faces the impeller 40, and a gap 65 which forms a transfer outlet zone between the impeller shroud 42 and back liner 36 and which provides for fluid communication between the collection chamber 60 and the pumping chamber 38. The peripheral side wall 68 of the collection chamber 60 is substantially parallel to the axis of rotation X-X leading to the open side 64, and the outer peripheral diameter of the open side 64 is less than the diameter of the pumping chamber 38.

As mentioned previously, at the inlet region (pumping chamber 38 in front of the impeller 40) of a froth pump there is a low pressure region at the centreline of the impeller 40 around the eye region 51 and therefore the air tends to accumulate there. This means that the heavier fluids (the particles) travel towards the outer pump wall. The air accumulated in this area does not go through the pump in the normal fashion due to a combined condition of low pressure and low density, and instead works as a cushion to the slurry coming from upstream. This generally results in the pump performing poorly or losing its functionality, by using power to no effect. As the air accumulates at the centre line of the impeller 40 in the region of the eye 51, it can be removed from that region by placing passageways in the form of through-holes 52 through the impeller 40 so that the air flows into a collection chamber 60 which may also be referred to as an expeller chamber. The through-holes 52 in the impeller back shroud allow the air to escape, thus releasing the cushion effect. Typically the pressure on the front side of the impeller 40 is greater than the pressure in the collection chamber 60 which causes the air to flow into the through-holes 52. If there are one or more venting outlets leading out of the back of the collection chamber 60, then air flows through the impeller through-holes 52 into the collection chamber 60 and then out through those venting outlets—in fact, air is drawn into the collection chamber 60.

Figure 4:
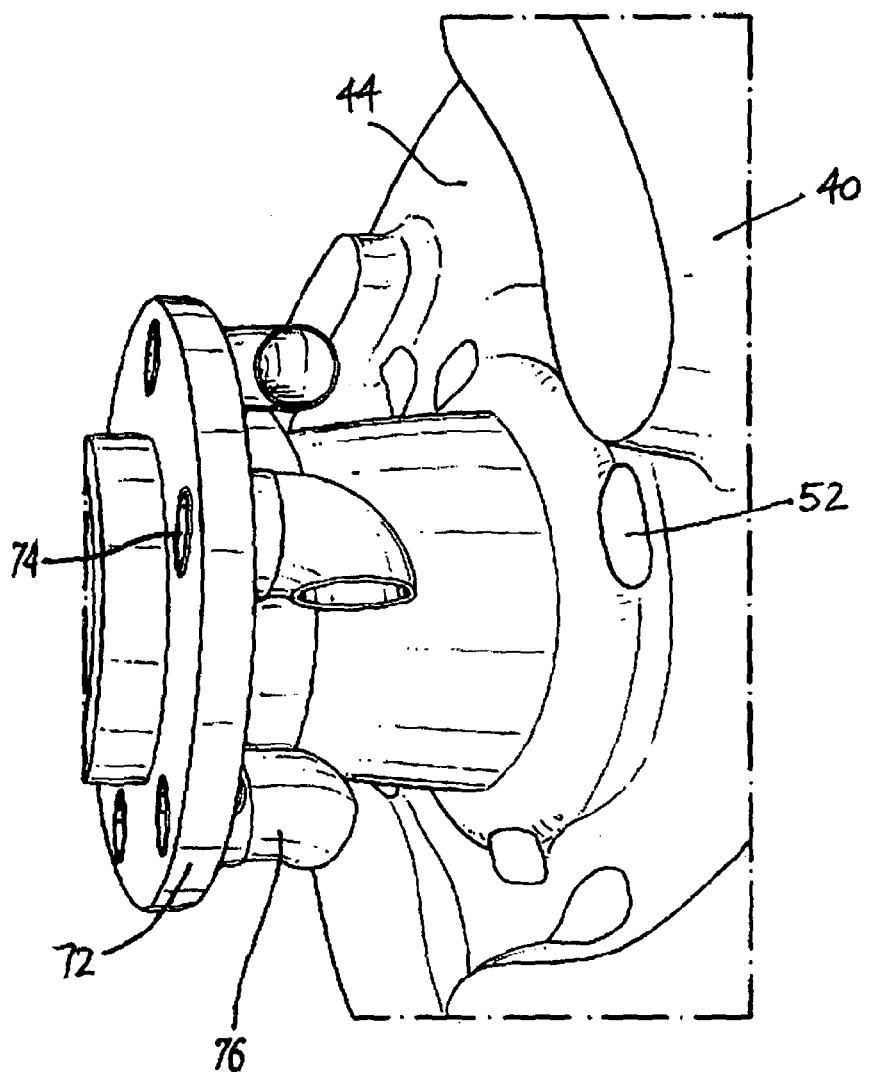
FIG. 4 is a detail of a flow inducer according to one embodiment, when connected to a pump impeller.
Figure 5:
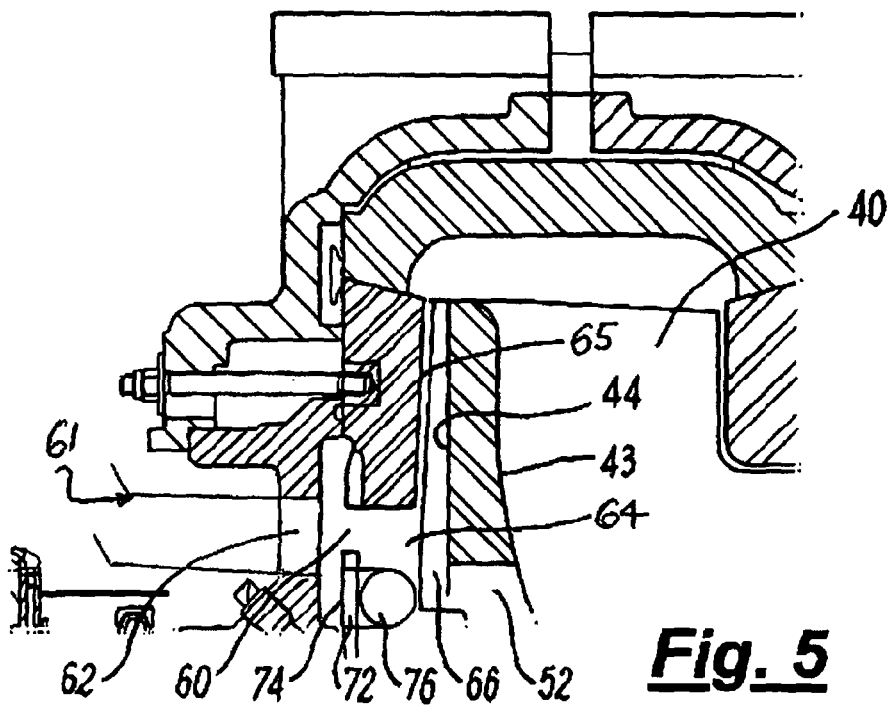
FIG. 5 is a cross-sectional detail of part of a pump according to one embodiment.
Figure 6:
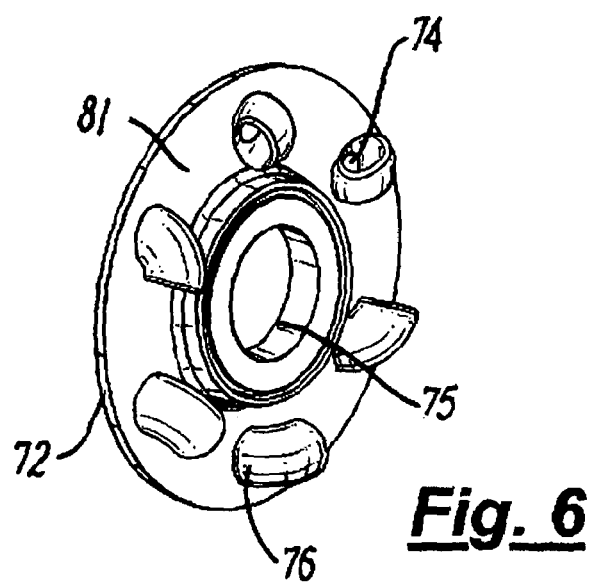
FIG. 6 is a detail of the flow inducer of FIG. 4.

Embodiments are shown in which the pump 10 further includes a flow inducer which is mounted for rotation within the collection chamber 60. The flow inducer, which may also be referred to as an agitation device, is operatively mounted to the drive shaft 18 so that in operation both the impeller 40 and the inducer are rotated together by the drive shaft. In one form shown in FIGS. 1, 2 and 7, the flow inducer is configured in the form of a paddle mixer impeller 70 having rectangular shaped impeller blades 71 fitted radially about a collar 73, which is fixed to the pump drive shaft. In use, the impeller blades 71 are angled in such a manner so as to cause a generally axial flow of material (that is, a flow generally in line with the rotation axis X-X) through the collection chamber 60 and out towards the venting hole 62. In another form shown in FIGS. 4, 5 and 6, the flow inducer is configured in the form of a disc impeller 72 which is mounted to the drive shaft at the central hole 75. The disc impeller 72 has six spaced-apart peripheral through-holes 74 located therethrough, the entry to each of which is fitted with a 90-angle degree pipe bend (or elbow end) fixture 76. The pipe bends 76 are located on the side 81 of the disc impeller 72 which, in use, is facing the rear face 44 of the impeller 40. Each pipe bend 76 is oriented so as to form a scoop which creates a recirculating, turbulent flow over the top of/around the peripheral edge of the disc impeller 72. This agitation results in a generally axial flow of material (that is, a flow generally in line with the rotation axis X-X) through the collection chamber 60 and out towards the venting hole 62.

The flow inducer 68 may take many forms, for example it may comprise another style of impeller, a marine propeller, or a paddle wheel. One purpose of the inducer is to promote the flow of excess froth gases from the region of the front face 43 of the impeller, through the passageways or through-holes 52, through the collection chamber 60 and out through the venting hole 62.

In FIGS. 8 to 20, where possible, the same reference numerals have been used to describe the same components which were described in the earlier embodiments.

Figure 8:
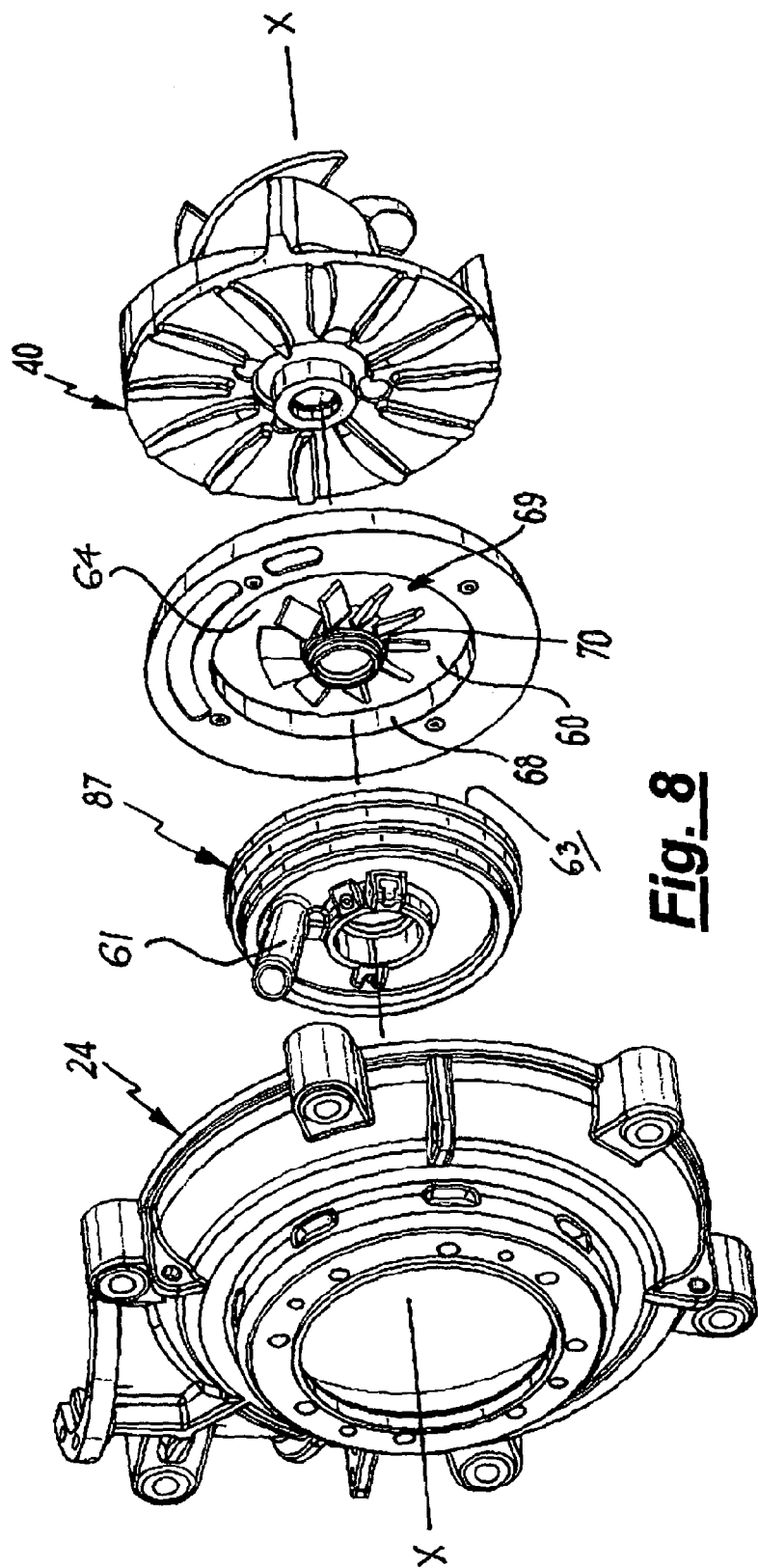
FIG. 8 is an exploded perspective partial view of a pump according to a further embodiment.
Figure 9:
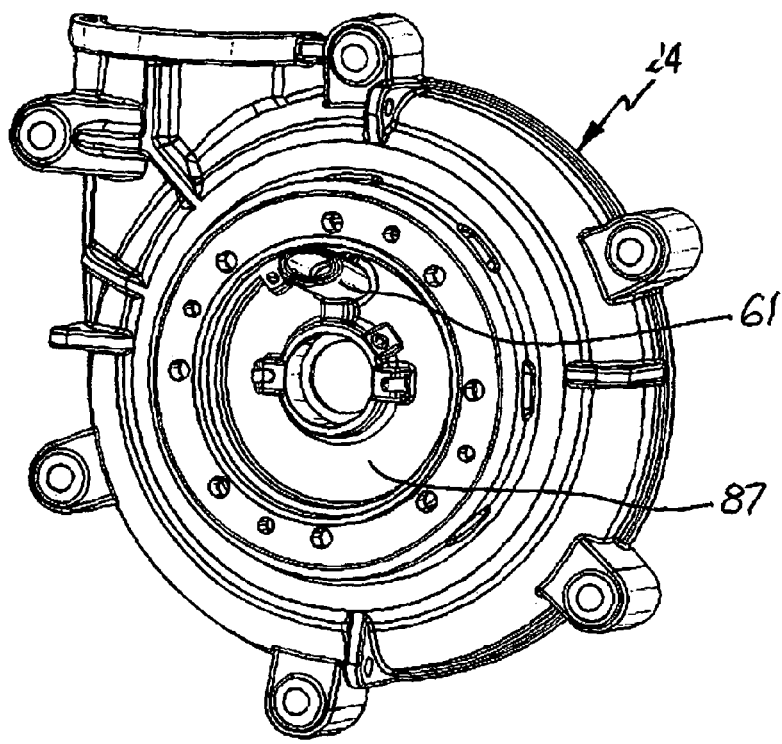
FIG. 9 is a schematic view of a portion of the pump shown in FIG. 8 in a partially assembled position.
Figure 10:
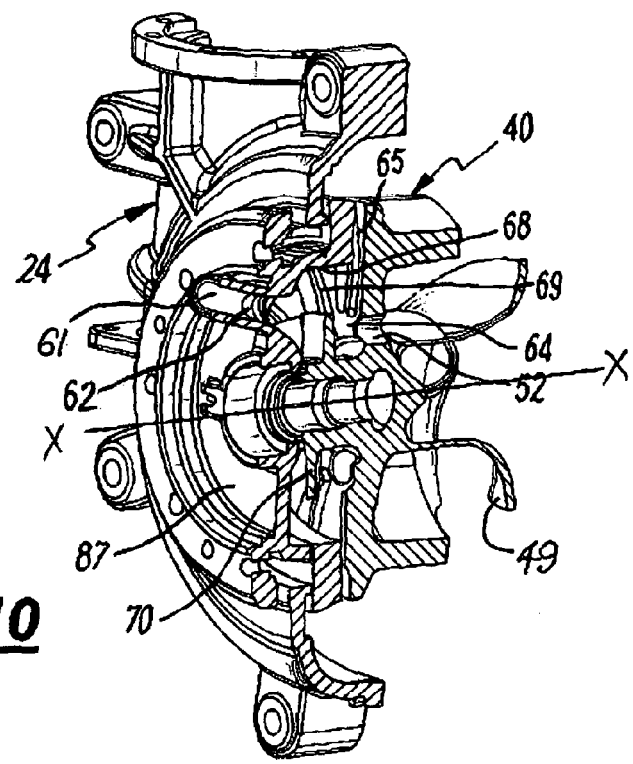
FIG. 10 is a cut away sectional view of the pump portion shown in FIG. 9.
Figure 11:
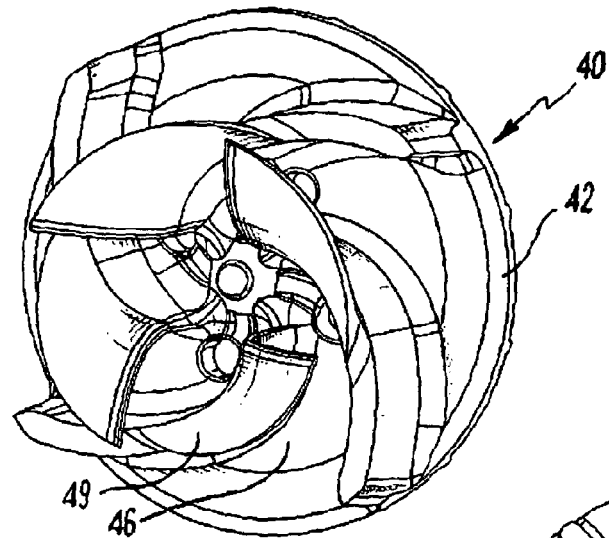
FIG. 11 is a front side perspective view of an impeller according to an embodiment.
Figure 12:
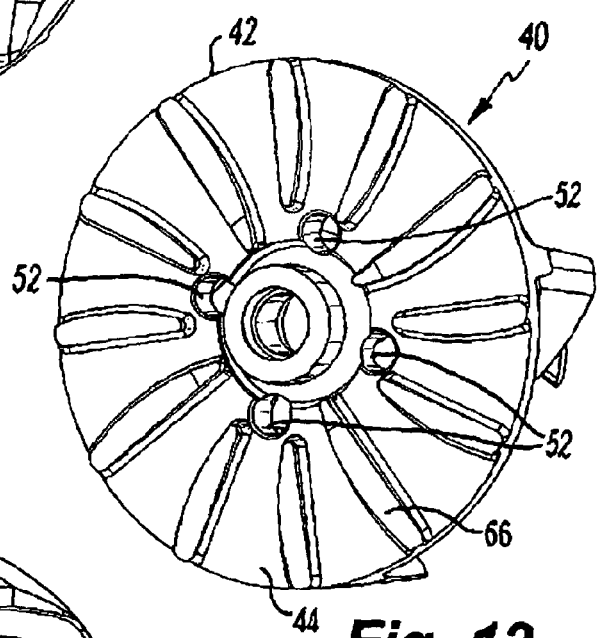
FIG. 12 is a rear side perspective view of the impeller shown in FIG. 11.
Figure 13:
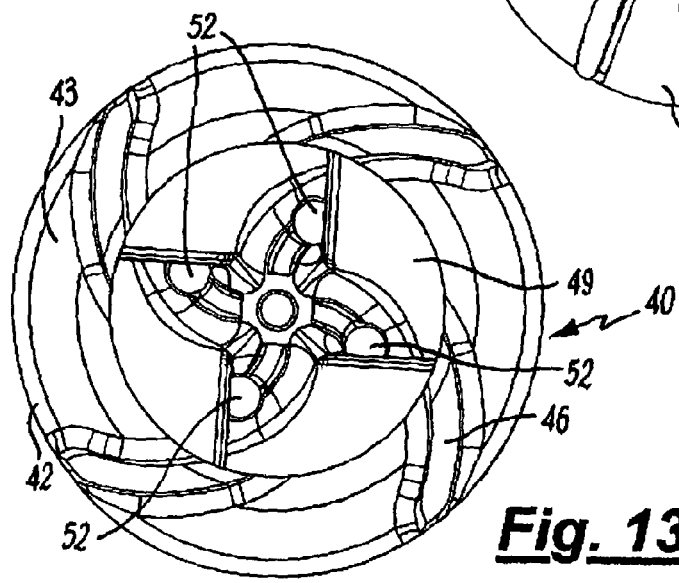
FIG. 13 is a front side elevation of the impeller shown in FIGS. 11 and 12.
Figure 14:
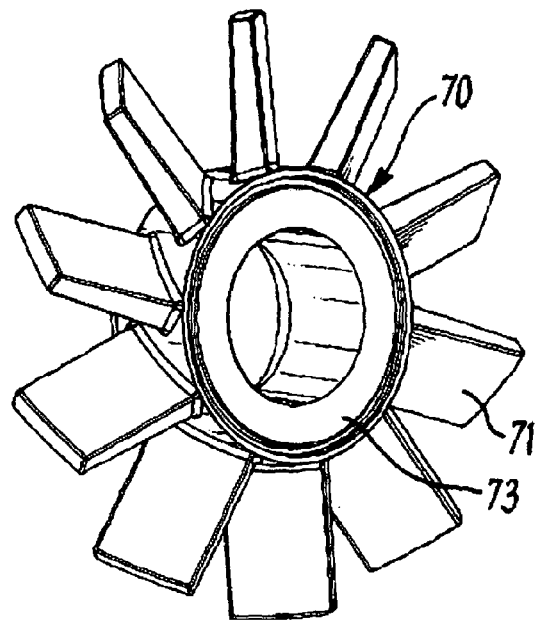
FIGS. 14 to 16 are various views (side perspective and front side elevation views) of the flow inducer shown in FIGS. 8 and 10.
Figure 15:
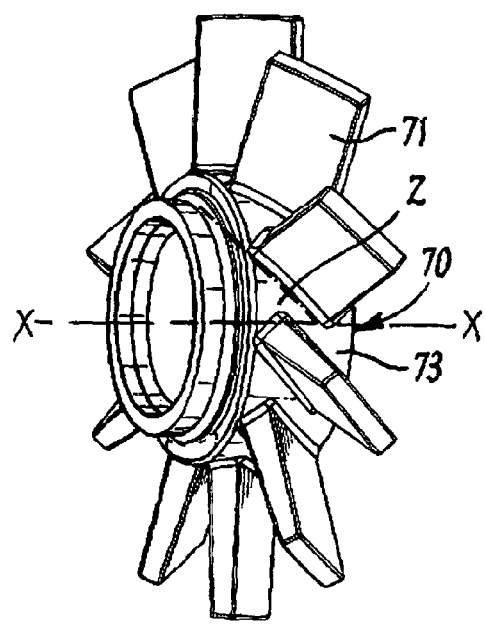
Figure 16:
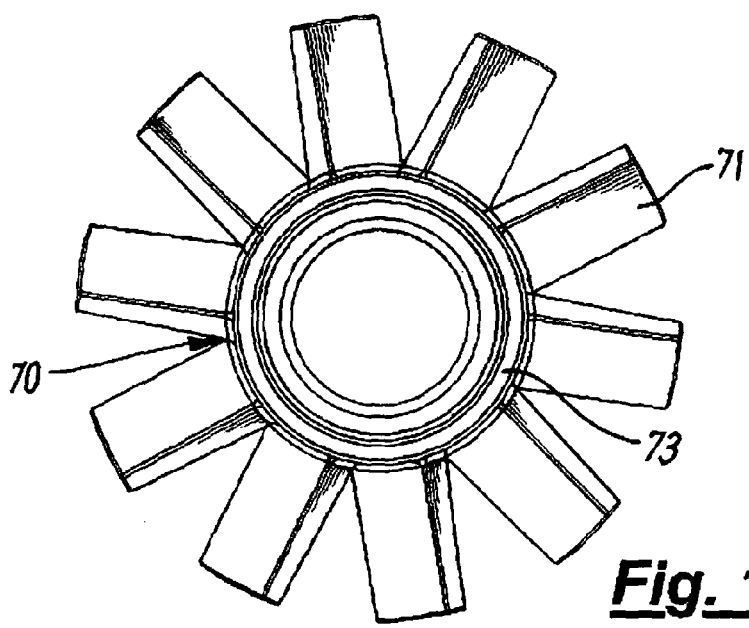
Figure 17:
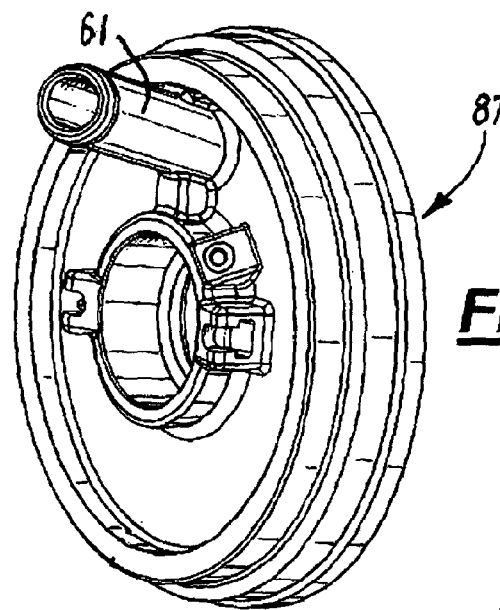
FIGS. 17 to 19 are various views (respectively: front side perspective view; front side elevation; and side sectional view) of a back plate or stuffing box which forms part of a collection chamber according to the embodiment shown in FIGS. 8, 9 and 10.
Figure 18:
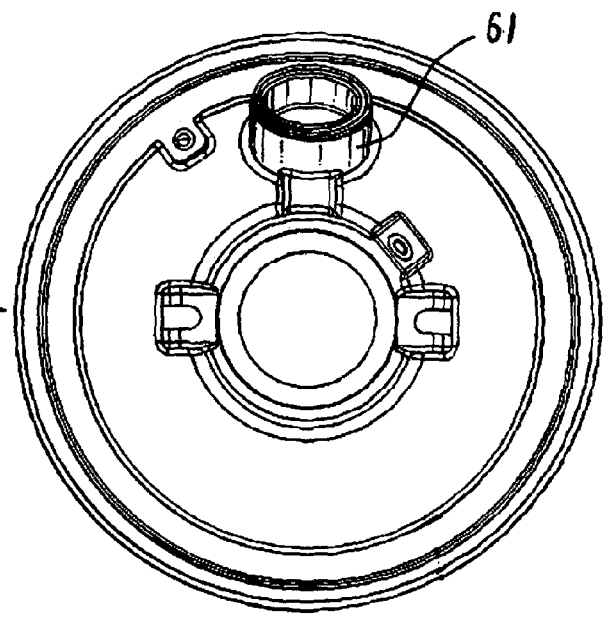
Figure 19:
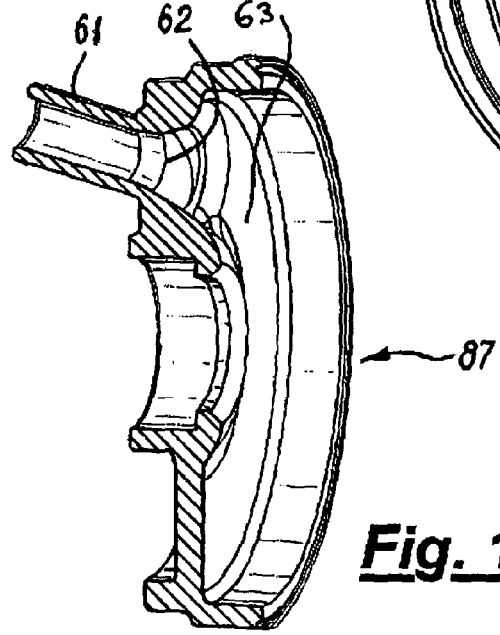

As illustrated in FIG. 8 and in related FIGS. 9 to 20, a pump 10 is shown in partial view and in exploded view, which comprises an outer casing which includes a rear casing part 24. The front casing part is not illustrated, but can be similar to the rear casing part in appearance. The pump illustrated in this embodiment does not show the inner liner 30. The pump includes an impeller 40 which is generally of the same structure as that described earlier.

As described with reference to the earlier embodiments, a collection chamber 60 is formed with an outer peripheral side wall 68 and a rear wall 63. The side wall 68 extends substantially parallel to the axis of rotation X-X to the open side 64 which, when in an assembled position, is spaced from the rear face 44 of the impeller 40 so as to provide a gap 65 therebetween.

Figure 7:
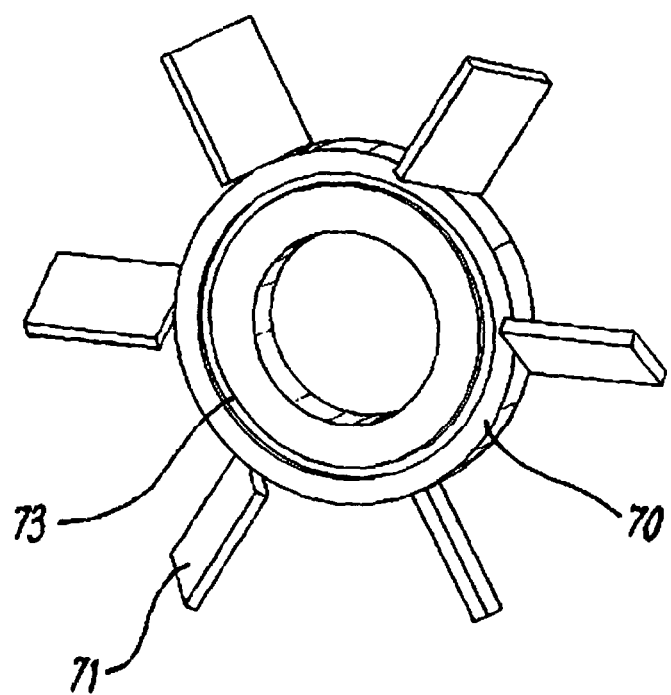
FIG. 7 is a detail of a flow inducer according to one embodiment.

The flow inducer in the form of a paddle mixer impeller 70 in this embodiment is somewhat similar to that shown in FIG. 7, but in this embodiment comprises ten blades 71. The blades 71 are slightly inwardly tapered towards the outer free end thereof (although they can also be straight-sided) and are inclined at an angle Z with respect to the axis of rotation X-X. Typically the angle Z can be about 45°. The configuration of the blades 71 is so as to cause an axial flow as well as a swirl flow of the mixture within the collection chamber 60.

When in operation, the flow inducer in the form of the paddle mixer 70 has an outer section which is spaced from the peripheral wall 68 forming an annular-shaped heavier fraction concentration zone 69, and into which the heavier fraction tends to migrate, and from there the heavier fraction is caused to exit the collection chamber 60 via the gap 65 between the rear face of the impeller shroud 42 and the back liner 36 and to flow around the impeller 40 and back into the pumping chamber 38. The heavier fraction concentration zone 69 extends from the rear wall 63 of the stuffing box 87 along the outer peripheral wall 68 of the collection chamber 60 and up to the open side 64. The purpose of the flow inducer is to induce flow from the pumping chamber 38 to the collection chamber 60 and thereafter to assist the auxiliary vanes 66 on the back shroud of the impeller 40 to separate the fluid therein into a lighter fraction (primarily gas) and a heavier fraction (primarily liquid and some particulate matter). The lighter fraction is caused to pass out through the venting hole 62 and to exit the pump toward a region of lower pressure.

Figure 20:
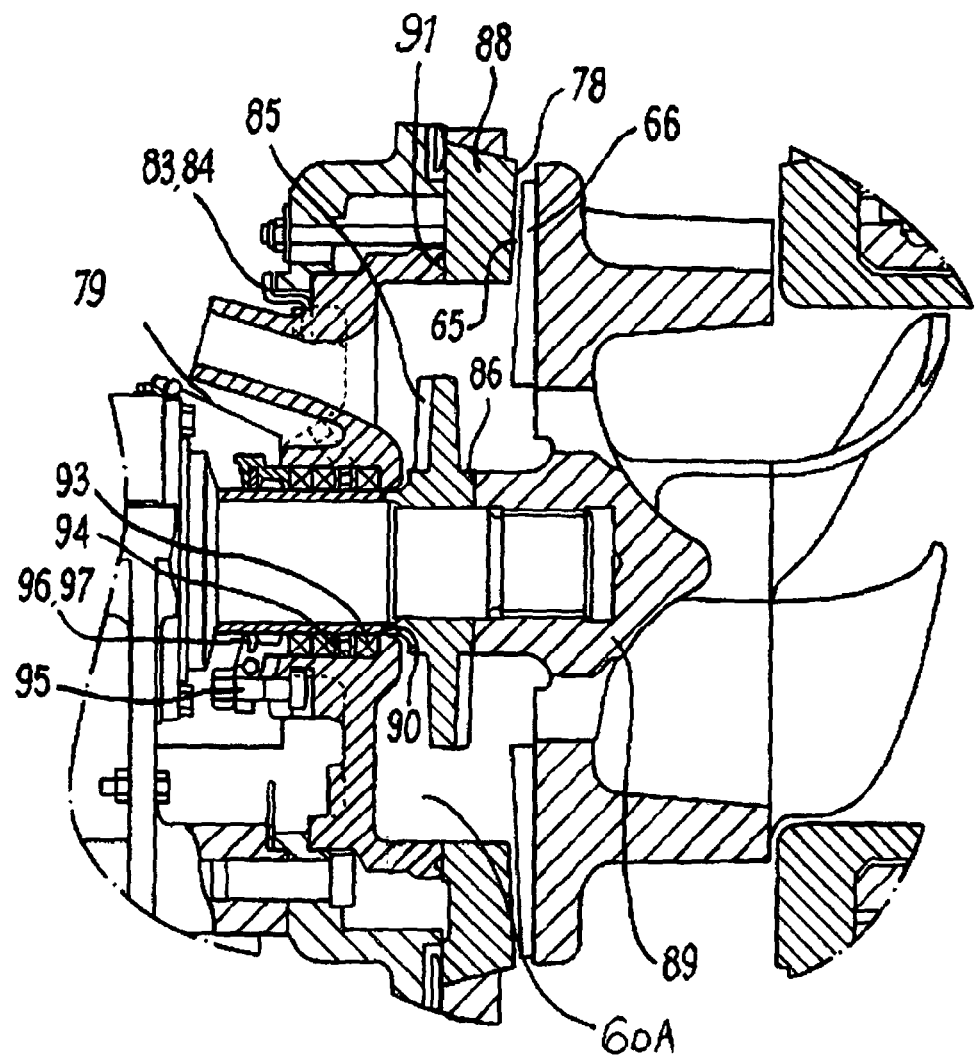
FIG. 20 is partial sectional side elevation of a portion of a pump according to a further embodiment.

The embodiment shown in FIG. 20 is generally similar to that illustrated in FIG. 8. For ease of reference similar parts have been given the same part number as in previous embodiments. In FIG. 20 the impeller 89 is generally similar to the impeller 40 described earlier in relation to FIG. 8. The auxiliary vanes 66 on the impeller 89 are tapered so as to become thinner in depth when moving in a direction away from an inner end (closest to the axis of rotation X-X of the impeller) towards an outer end. The face 78 of the back liner 88 is also inclined and parallel to the surface of the auxiliary vanes 66 so that a narrow passage 65 for the transfer of fluid from the collection chamber 60A to the pumping chamber is formed between the auxiliary vanes 66, the rear face of the shroud of the impeller 89 and the face 78. This passage 66 is not orthogonal to the axis of rotation X-X but is inclined in a direction towards the pumping chamber.

The embodiment shown in FIG. 20 includes a gland seal assembly in detail which includes a packing 93, a lantern ring 94, a gland bolt 95 and a drain and a seal ring 96 and 97. There is also provided a seal guard 79 for protection of the operator.

The embodiment shown in FIG. 20 further includes a clamp plate 83 and set screw 84. The flow inducer is illustrated in the form of an impeller 85. The embodiment further includes O-ring seals 86, 90 and 91 to minimise pump leakage.

Figure 21:
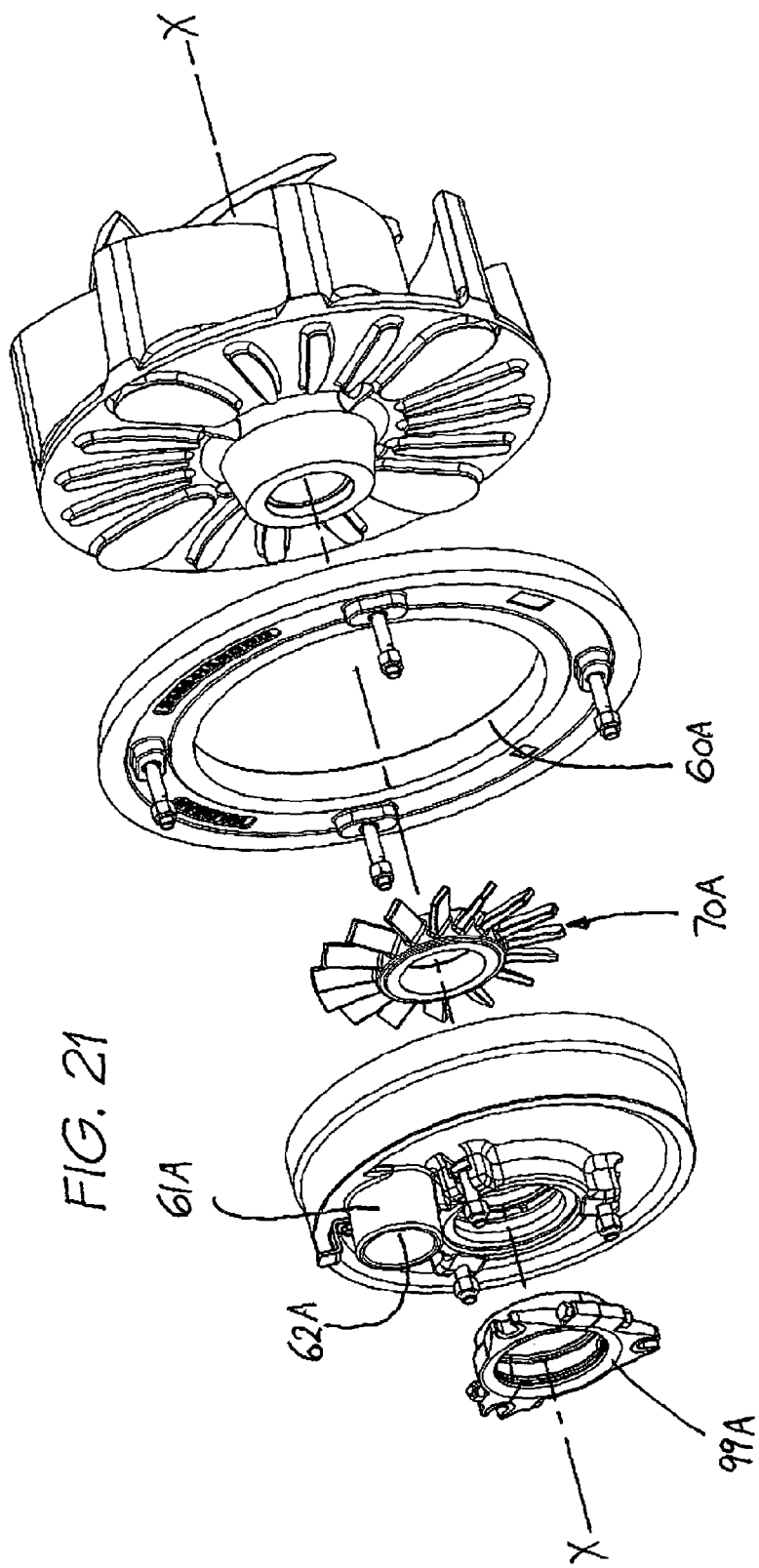
FIG. 21 is an exploded perspective partial view of a pump according to a further embodiment.

The embodiment shown in FIG. 21 is generally similar to that illustrated in FIGS. 8-20. In this embodiment, the flow inducer in the form of a paddle mixer impeller 70A which is similar to the impeller shown in FIG. 8 and FIGS. 14-16, but in this embodiment it comprises sixteen blades. As was the case for FIG. 8, the blades are slightly inwardly tapered towards the outer free end thereof and are inclined at an angle Z with respect to the axis of rotation X-X. Typically the angle Z can be about 45°. The configuration of the blades is so as to cause an axial flow as well as a swirl flow of the mixture within the collection chamber 60A.

In addition, FIG. 21 shows a different gland 99A on the frame plate liner to hold the packing in position, with the gland being held by three fastening bolts rather than the more conventional two-bolt arrangement shown in FIG. 8. Finally, a further difference is that the venting hole 62A in the stuffing box rear wall is round in shape, compared with the elliptical shape shown in FIGS. 8-10 and FIGS. 17-19, in order to maximise the volume of gas which can be expelled from the collection chamber 60A in use. A round venting hole also has the advantage of being able to be more easily attached to a standard round cross-section hose or vent pipe 61A, and if space permits, a large venting hole is desirable.

The various embodiments of air removal systems described herein operate continuously to vent the pump during use. The combination of the slurry impeller, the auxiliary (rear expelling) vanes and the flow inducer when acting together creates an environment for more effective separation of the air and slurry material. Furthermore the system is retrofittable to an existing froth pump.

With particular reference to froth pumps, mineral froths containing abrasive solids may have highly variable properties. The froth can be either brittle with gas/air bubbles being easily breakable or tenacious, with air/gases being difficult to separate. In general, complete or sufficient gas separation cannot be achieved within the pumping chamber. The pump described herein is designed to handle separation in both the pumping chamber and in the collection chamber during venting. In other words there is a first stage separation in the pumping chamber and a second stage separation in the collection chamber.

The flow inducer positively moves the flow of a first separated lighter fraction in the axial direction and, at the same time, rotates the mixture inside the collection chamber thus creating an environment for possible additional separation of solids into the second heavier fraction which can be returned to the pumping chamber or to the pump discharge outlet while, under the influence of pressure, forcing the gas/air saturated mixture (second lighter fraction) to self-discharge out of the collection chamber (preferably back to the pump suction tank, or any other disposal/treatment location).

In certain embodiments the impeller may include auxiliary vanes on the rear shroud face and the flow inducer may, in conjunction with the auxiliary vanes, facilitate the passage of a heavier fraction of the material in the collection chamber through the transfer outlet zone into the outer region of the pumping chamber.

In other embodiments, the blades of a flow inducer in the form of a paddle mixer impeller can be aerofoil-shaped in cross-section, with the aim of increasing the propulsion in the collection chamber. In some tenacious froth media, such as bitumen froths, more expelling capability may be required to facilitate secondary separation of heavy and light fractions in the collection chamber, and propulsion of the secondary light fraction out through the venting hole. This may also be achieved in some embodiments by increasing the diameter of the impeller/propeller of the current embodiment shown in the Figures.

In one experimental trial, a froth pump having the features of the invention operated quite satisfactorily with a Froth Volume Factor (FVF) of 6.0 with a pumped froth flowrate in range 530-560 $m^3/h$. In the conventional froth pumps, the maximum FVF which can be handled is 1.9-2.0. The FVF is a calculated figure which relates to the volume fraction of air in the froth. A more gaseous froth leads to low efficiency pumping with higher relative power consumption. The froth impeller may be rotating, but often only in an envelope of air. In some cases, operators attempt to add chemicals to collapse the froth, but this adds cost and may not work, and may also not be appropriate depending on the material being pumped or the environment.

In a further experimental trial, the performance of a froth pump having the features of the invention was compared with the performance of a competitor commercial froth pump. The experimental data is shown in FIG. 22. During the pumping experiments, Power (kW) and froth Flow Rate ($m^3/hr$) were measured. A general line of best fit was drawn to broadly categorise the data trends, which shows generally that in order to pump froth at a higher flow rate requires linearly more power. As can be seen from the data, the froth pump of the invention was able to achieve the same flow rates of feed froth slurry as the competitor product but with nearly half of the operational power requirement. This indicates that the froth pump of the invention was more efficient at removing air from the feed froth material, leading to more effective pumping of the remaining slurry material and thus requiring lower power to achieve that pumped material outcome.

In a field trial at a mine site in Finland, a pump featuring the invention consistently operated with a FVF of up to 4.0 with a stable performance. The plant observed that the volume flow exiting the pump discharge was lower overall because of the removal of the air from the froth feed material via the chamber and the vent pipe. Furthermore, the field trial measured an energy saving of 25% compared with the incumbent competitor pump.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer, "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense; that is, in the sense of "including", and thus not limited to its "closed" sense; that is, the sense of "consisting only of". A corresponding meaning is to be attributed to the corresponding words "comprise, "comprised" and "comprises" where they appear.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A pump comprising a pump casing having a front side and a rear side with a pumping chamber within the pump casing, an inlet to the pumping chamber, and a discharge outlet from the pumping chamber, an impeller mounted for rotation within the pumping chamber about a rotation axis, the pumping chamber including an inner region at or near the rotation axis and an outer region remote from the rotation axis, the discharge outlet being in the outer region of the pumping chamber, the impeller including a shroud having a front face and a rear face with a plurality of pumping vanes extending from the front face, characterised in that the pump further includes a collection chamber at the rear side of the pump casing, the collection chamber being in fluid communication with the pumping chamber, the impeller including one or more passageways extending through the shroud, one end of said passageways opening into the collection chamber and the other end opening into the pumping chamber through the front face of the impeller, and a flow inducer disposed within the collection chamber, the flow inducer including an inducer element mounted coaxially with the shroud and at least partially axially spaced apart from the shroud for rotation within the collection chamber and configured to generate an axial flow component in an axial direction with respect to the rotation axis and a swirl flow component of a fluid within the collection chamber, the collection chamber including a venting outlet configured for the discharge of fluid from the collection chamber in the axial direction and a transfer outlet zone in fluid communication with the outer region of the pumping chamber, wherein the flow inducer is one of a paddle mixer impeller comprising impeller blades axially spaced apart from the rear face of the shroud and inclined at an angle, a disc impeller comprising through holes and a plurality of pipe bend fixtures axially spaced apart from the rear face of the shroud, a marine propeller comprising blades axially spaced apart from the rear face of the shroud, and a paddle wheel comprising paddles axially spaced apart from the rear face of the shroud.

2. A pump according to claim 1, including a drive shaft, the impeller and inducer element being operatively mounted to the drive shaft for rotation thereby, and wherein a forward most edge of the inducer element is aft of an aft most edge of the shroud along a central longitudinal axis of the drive shaft.

3. A pump according to claim 1, wherein each passageway is disposed within the inner region of the pumping chamber.

4. A pump according to claim 1, wherein the venting outlet is remote from the pumping chamber.

5. A pump according to claim 1, wherein the venting outlet and each passageway are substantially parallel to the rotation axis.

6. A pump according to claim 1, wherein the collection chamber includes an open front side facing the impeller and the transfer outlet zone is comprised by an annular gap between the rear side of the pump casing and the rear face of the impeller.

7. A pump according to claim 1, further including auxiliary vanes on the rear face of the shroud.

8. A pump according to claim 6, wherein the collection chamber further includes a side wall and a rear wall remote from the open front side, and the venting outlet being in the rear wall.

9. A pump according to claim 8, wherein the open front side of the collection chamber has an outer peripheral diameter which is less than the diameter of the pumping chamber.

10. A pump according to claim 7, wherein the collection chamber further includes a side wall and a rear wall remote from the open front side, and the venting outlet being in the rear wall.

11. A pump according to claim 10, wherein the open front side of the collection chamber has an outer peripheral diameter which is less than the diameter of the pumping chamber.

12. A pump according to claim 1, wherein the pump is a froth pump for pumping frothy fluids wherein the impeller is configured to separate the frothy fluid into a heavier fraction which is discharged through the discharge outlet and a lighter fraction which enters the collection chamber via the passageways where the inducer separates the lighter fraction into a secondary heavier fraction which is returned to the pumping chamber via the transfer outlet zone and the remaining fluid is discharged through the venting outlet.

13. A pump according to claim 1, wherein there is a channel between adjacent pumping vanes, one or more of the channels having one or more said passageways therein.

14. A method of pumping a fluid through a pump, the fluid being capable of separating into lighter and heavier fractions, the pump being in accordance with claim 1, the method including:
(a) feeding the fluid into the pumping chamber wherein a first heavier fraction is discharged through the discharge outlet and a first lighter fraction migrates towards the inner region of the pumping chamber;
(b) causing the first lighter fraction to enter the collection chamber through the or each passageway and thereafter; and
(c) causing separation of the first lighter fraction into a second heavier fraction and a second lighter fraction wherein the second heavier fraction is returned to the pumping chamber via the transfer outlet zone, and the second lighter fraction passes out of the collection chamber through the venting outlet.

15. A method according to claim 14 wherein the pumped fluid is a frothy fluid.

* * * * *